United States Patent
Yamagami

(10) Patent No.: US 7,654,904 B2
(45) Date of Patent: Feb. 2, 2010

(54) GAME MACHINE, BACKUP CONTROL PROGRAM OF GAME DATA AND BACKUP CONTROL METHOD

(75) Inventor: Hitoshi Yamagami, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 572 days.

(21) Appl. No.: 10/712,312

(22) Filed: Nov. 14, 2003

(65) Prior Publication Data

US 2004/0142751 A1    Jul. 22, 2004

(30) Foreign Application Priority Data

Nov. 15, 2002   (JP) ............................. 2002-331625

(51) Int. Cl.
*A63F 9/24*    (2006.01)

(52) U.S. Cl. ............................. 463/43; 463/1; 463/44; 463/45

(58) Field of Classification Search .................... 463/43; 711/159–162, 136

See application file for complete search history.

(56) References Cited

U.S. PATENT DOCUMENTS 4,948,138 A * 8/1990 Pease et al. .................... 463/24

(Continued)

FOREIGN PATENT DOCUMENTS

JP   59-082700   5/1984

(Continued)

OTHER PUBLICATIONS

Smith, Steven W. The Scientist and Engineer's Guide to Digital Signal Processing, "Circular Buffering". 1997. pp. 506-509. Retrieved from www.dspguide.com on Jul. 10, 2008.*
Omkar Deodhar's Declaration.*

*Primary Examiner*—Dmitry Suhol
*Assistant Examiner*—Omkar Deodhar
(74) *Attorney, Agent, or Firm*—Nixon & Vanderhye P.C.

(57) ABSTRACT

A game machine includes a CPU and, when a game cartridge is loaded in the game machine, the CPU is electrically connected to a ROM in the game cartridge and an electronically erasable non-volatile flash memory having at least two game data storage backup areas. Game data generated during the progress of a game is maintained in a volatile work memory and, in response to an instruction provided by a user, an attempt to save this data (referred to herein as "last" game data or as the "latest" game data) in an appropriate backup storage area of a non-volatile flash memory is made. Whenever the user instructs the game machine to save a game, the CPU compares the write age of each backup area and selects a game data backup area that is stored with game data having an oldest write age. Because electronically erasable non-volatile memories become less reliable and susceptible to degradation and failure after repeated usage, the CPU attempts a writing of the game data to the selected backup area, and then immediately performs a check to determine if the write operation to the selected backup area was successfully performed. If writing to the selected backup area can not be successfully performed after a predetermined number of repeated attempts, for example, due to memory element defect or an abrupt failure of memory area, and only a single other remaining backup storage area containing older game data is available, a writing of the latest game data over the game data from a previous gaming session which was stored in that single remaining backup storage area is precluded (i.e., prohibited), so as to always leave intact at least one area of older saved game data that was generated during the preceding game play session. Writing to the selected backup area to save the latest game data is prohibited if there are not at least two available and writable (i.e., non-defective) backup areas present in the non-volatile memory. In addition, the flash memory may be provided with flag storage areas for identifying "write prohibited" backup areas and "unwritable" backup areas.

9 Claims, 14 Drawing Sheets

U.S. PATENT DOCUMENTS

| | | | | |
|---|---|---|---|---|
| 5,014,982 | A | * | 5/1991 | Okada et al. ............... 463/29 |
| 5,609,525 | A | * | 3/1997 | Ohno et al. ............... 463/43 |
| 5,778,167 | A | * | 7/1998 | Carrel et al. ............... 714/8 |
| 6,007,428 | A | | 12/1999 | Nishiumi et al. |
| 6,220,964 | B1 | * | 4/2001 | Miyamoto et al. ............ 463/43 |
| 6,478,679 | B1 | * | 11/2002 | Himoto et al. ............... 463/36 |

FOREIGN PATENT DOCUMENTS

| | | |
|---|---|---|
| JP | 62-075853 | 4/1987 |
| JP | 03-102593 | 4/1991 |
| JP | 03-228298 | 10/1991 |
| JP | 5-12139 | 1/1993 |
| JP | 05-334005 | 12/1993 |
| JP | 07-039649 | 2/1995 |
| JP | 08-079961 | 3/1996 |
| JP | 09/155065 | 6/1997 |
| JP | 10-31611 | 2/1998 |
| JP | 2000-020248 | 1/2000 |
| JP | 2001-175543 | 6/2001 |
| JP | 2002-263361 | 9/2002 |

* cited by examiner

FIG. 4
(A)
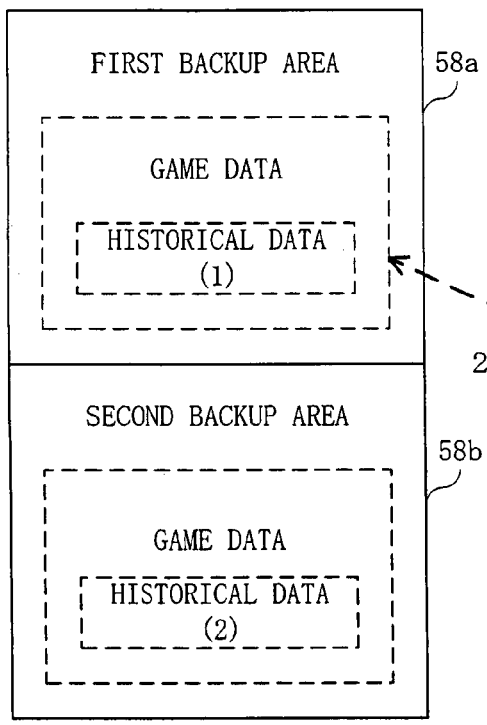
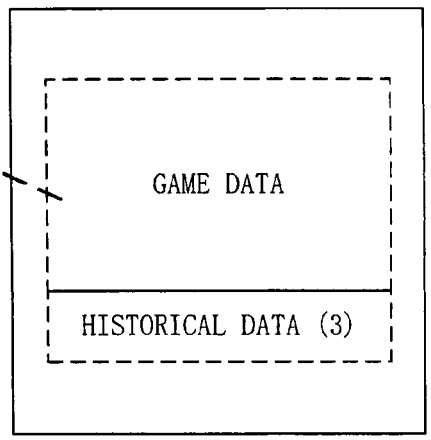
(B)
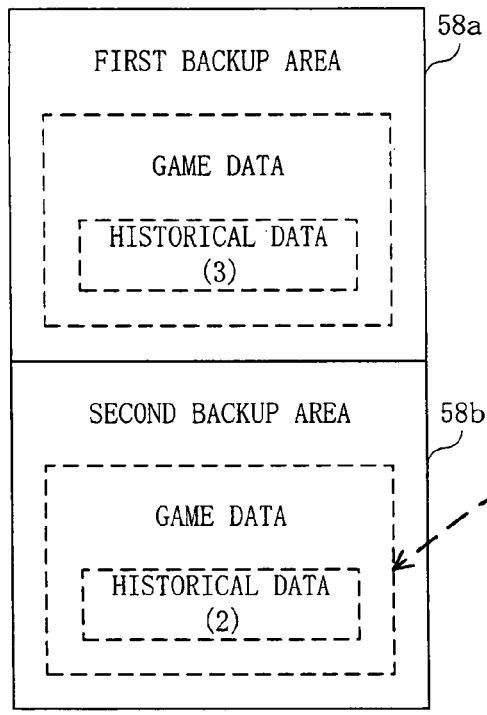
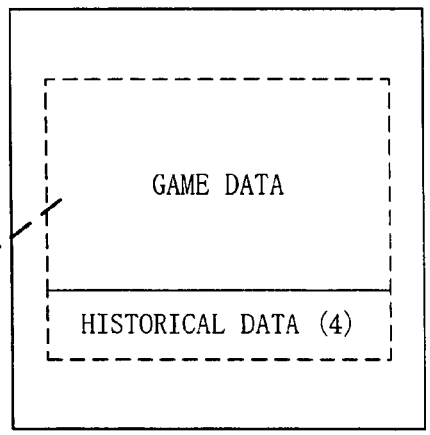

FIG. 5
(A)
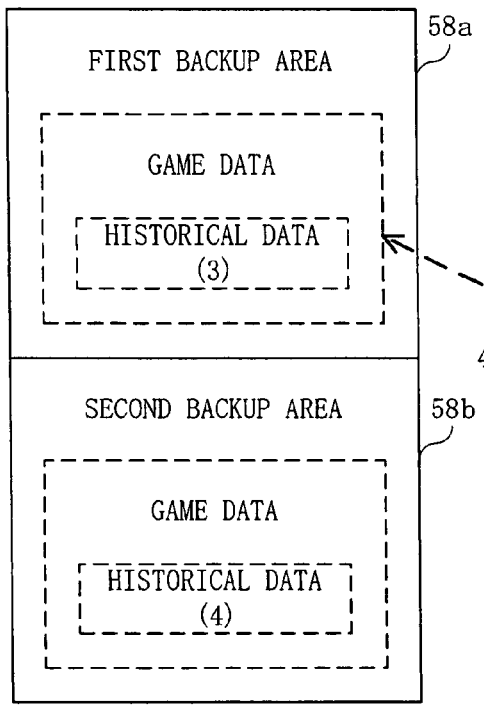
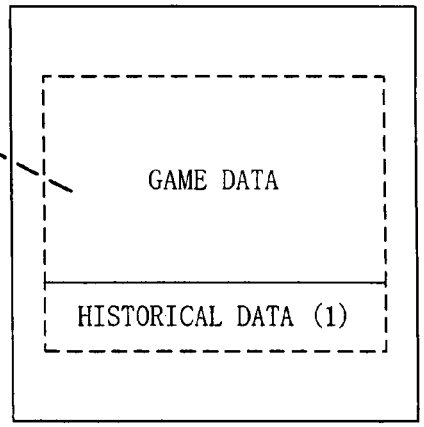
(B)
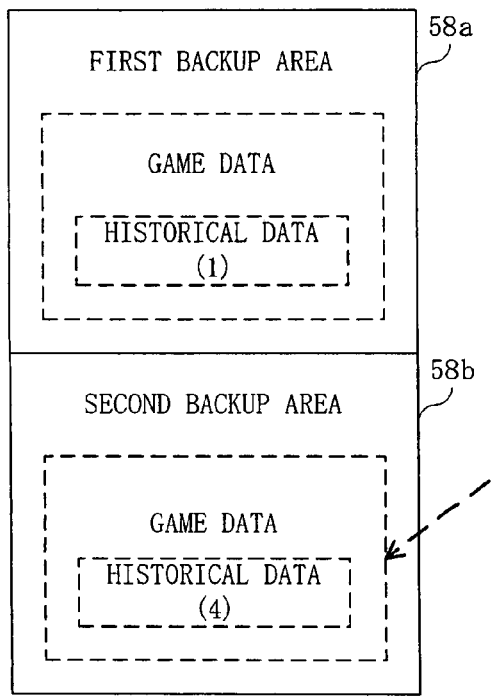
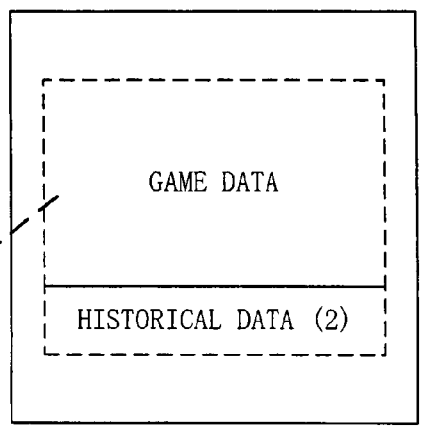

FIG. 7
(A)
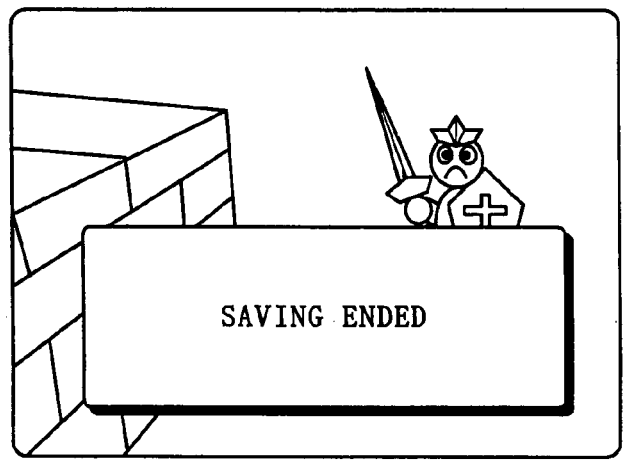
(B)
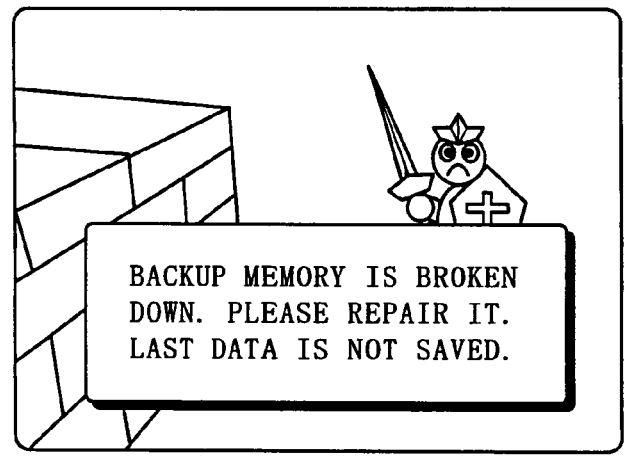
(C)

US 7,654,904 B2

GAME MACHINE, BACKUP CONTROL PROGRAM OF GAME DATA AND BACKUP CONTROL METHOD

FIELD OF THE INVENTION

The present invention relates to a game machine, a game backup control program and a game backup control method for backing-up game data. More specifically, the present invention relates to a game machine provided with a nonvolatile memory having two or three or more backup areas within an electrically rewritable storing area and game data is written into the backup area, and a backup control program and a backup control method for the game data.

BACKGROUND

An example of this kind of a conventional game machine is disclosed in a Japanese Laid-open Patent No. 5-12139 published on Jan. 22, 1993. In a hot start system of the prior art, a backup portion is selected among storing areas for game 1 to game 3, provided in a static RAM of a game cartridge, in response to an operation by an operator. If no game data has been backed-up in a selected backup portion, a backup-objective data area of the scratch RAM provided in a video game machine is initialized so as to start a game at the beginning. On the other hand, if the game data has been backed-up in the selected backup portion, the game data is read into the scratch RAM of the video game machine so as to resume the game. As the game progresses, the game data in the scratch RAM is renewed, and for example, every time of making a hero act, the backup-objective data out of the game data of the scratch RAM is automatically stored in a predetermined (selected) storing area in the static RAM of the game cartridge, whereby the game status can be automatically backed-up at any time.

Furthermore, another example of the prior art is disclosed in a Japanese Patent Laid-open Patent Publication No. 10-31611, published on Feb. 3, 1998. In a file system for a nonvolatile memory storage medium disclosed in this prior art, a logical block number obtained by searching a minimum writing times information value among unassigned state information in a usage frequency list is made as a write-objective block allowing, available memory blocks to be written uniformly, that is, the frequencies of the writing to the blocks are made even so as to effectively lengthen the life of the nonvolatile memory.

However, in the former, a static RAM is utilized as a backup memory backing-up the game data, and therefore, it is necessary to utilize a battery for. Thus, there is a significant possibility that the battery will die during a game in which the battery is low, and in such a case, there is a problem that all the game data within the static RAM may be lost. Recently, in order to avoid such problems, nonvolatile memory (e.g., flash memory, ferroelectric memory, etc.), which does not need a battery for holding data, is being utilized as a backup memory. Thus, with utilizing the nonvolatile memory, there is no fear of battery exhaustion. However, flash memory, has a disadvantage of being slow in writing speed and short in life as compared with static RAM. Therefore, if a backup portion selected by the user is continually being rewritten, the life of the storing elements in that backup area/portion of memory becomes shorter than another backup area/portion, and therefore, another problem occurs in that the game data stored in that continually rewritten backup portion of memory is apt to be lost.

On the other hand, in the latter example, the number of rewriting times of each memory block of the nonvolatile memory is made the same so as to prevent a specific memory block from being extremely shorter in life than other memory blocks.

However, even in view of the above-described prior arts, there still exists problems that if a storing element (or a part of storing area) becomes abruptly defective (due to a short life) during the time the latest game data is being written in the backup portion, it becomes impossible to write the latest game data, and furthermore, in the instance that a part of the latest game data has been written onto older game data, the older game data may also be lost. Furthermore, in a case that the power to the game machine is turned-off midway during writing the latest game data, there occurs a problem that both the latest game data and the older game data are lost, or worse yet, all the game data is lost. It is noted that preventing/loss of game data obtained by progressing through a game for long hours is critical for the player.

SUMMARY OF THE INVENTION

Notable aspects of the illustrative exemplary implementations disclosed herein include: a novel game machine apparatus, a game data backup control program and backup control method.

Another aspect of the example implementation disclosed herein is to provide a game machine, a game data backup control program and a backup control method capable of reliably preventing game data from at least the previous game play session from being lost.

An illustrative exemplary non-limiting implementation of a game machine comprising a nonvolatile memory which has two or three additional backup areas in an electrically rewritable storing area and which writes game data in these backup areas. The game machine comprises an area selecting means for preferentially selecting, whenever latest game data is about to be written, a backup area having an older writing time among two or three more backup areas as a write-objective backup area for the latest game data; a writing means for executing a writing of the latest game data into the write-objective backup area selected by the area selecting means; a determining means for determining whether or not the writing of the latest game data could be performed by the writing means; a repeating means for repeating, when it is determined the writing of the latest game data could not be performed by the determining means, a selection of the write-objective backup area by the area selecting means as necessary; and a prohibiting means for prohibiting, when only a backup area stored with game data written immediately before the latest game data finally becomes a selectable state by the area selecting means, a writing to the write-objective backup area.

Specifically, the game machine (10: reference numeral corresponding to a preferable embodiment described later and so forth) is provided with the nonvolatile memory (58) having at least the two backup areas in the electrically rewritable storing area, and the game data is written into the backup area. The area selecting means (40, S15) preferentially selects, when the latest game data is to be written, the backup area stored with the game data having an older writing time among at least two backup areas as the write-objective backup area of the latest game data. The writing means (40, S17, S25) executes the writing of the latest game data into the write-objective backup area selected by the area selecting means (40, S15). The determining means (40, S27) determines whether or not the writing of the latest game data could be performed by the writing means (40, S17, S25). The repeating means (40, S101, S103) repeats, whenever it is determined that the writing of the latest game data could not be performed by the determining means (40, S27), the selection of the write-objective backup area by the area selecting means (40, S15) as necessary. More specifically, in the case where the number of the backup areas is only two, even if it is determined that the latest game data could not be written, the selection of the write-objective backup area by the area selecting means (40, S15) is not repeated. On the other hand, in the case where the number of the backup areas is three or more, when it is determined the latest game data could not be written, the selection of the write-objective backup area by the area selecting means (40, S15) is repeated so as to repeatedly execute the writing process of the latest game data. Then, the prohibiting means (40, S29) prohibits, when only the backup areas stored with the game data written immediately before the latest game data finally becomes the selectable state by the area selecting means (40, S15), the writing to the write-objective backup area.

It is noted that in a situation where the game data has not previously been stored in the backup area, the backup area is selected with priority as a write-objective backup area.

One additional feature of the non-limiting example implementation disclosed herein is that it makes it possible to securely leave stored in memory the game data saved from a previous generation of game play.

In one non-limiting example implementation of the game machine disclosed herein, the writing means writes historical data for discriminating between oldness and newness of the game data by being included in the latest game data, and the area selecting means selects, before writing the latest game data, a backup area stored with game data written earlier than the latest game data as the write-objective backup area on the basis of the historical data. More specifically, since the writing means (40, S17, S25) writes the latest game data including the historical data for discriminating between the oldness and the newness of the game data, the area selecting means (40, S15) can select, before writing the latest game data, the backup area stored with the game data having an older writing time as the write-objective backup area on the basis of the historical data included in the old data. Accordingly, for example, game data having the oldest historical data is determined, allowing, the backup area in which the oldest game data is stored to be selected as the write-objective area.

In another non-limiting example implementation of the game machine disclosed herein, the prohibiting means includes a means for forcedly terminating a writing process of the latest game data when only the backup area stored with the game data written immediately before the latest game data finally becomes selectable as the write objective backup area by the area selecting means. More specifically, a terminating means (40, S29) forcedly terminates the writing process of the latest game data whenever only the backup area stored with the game data written immediately before the latest game data finally becomes selectable as a write-objective backup area by the area selecting means. Consequently, by this means, it is possible to securely leave the old game data saved in an area in memory for which overwriting is prevented. At this time, the latest game data is canceled.

In yet another non-limiting example implementation of a game machine disclosed herein, comprises a predetermined alarm message is displayed whenever overwriting of game data is prohibited. More specifically, when overwriting is prohibited by the prohibiting means (40, S29), a message displaying means (14, 40, S31) displays a predetermined alarm message so as to urge the user to exchange the nonvolatile memory.

One aspect of the exemplary implementation disclosed herein comprises a backup control arrangements in which the latest game data is written into two or more backup areas in an electrically rewritable storage area of a nonvolatile memory connected to the game machine. In this example implementation, the backup control arrangement makes a computer (processor) of the game machine perform: an area selection process that, whenever latest game data is written, selects a backup area containing stored game data of an older write time among two or more backup areas as a write-objective for writing (saving) the latest game data; writing of the latest game data to the selected write-objective backup area; determining whether or not the writing of the latest game data could be performed; repeating the selection of the write-objective backup area as necessary, if it is determined that the writing of the latest game data could not be performed; and, prohibiting a writing to the write-objective backup area, when a backup area stored with game data written immediately before the latest game data becomes selectable.

Another aspect of the exemplary implementation disclosed herein includes a backup control method by which game data is written in two or three more backup areas in an electrically rewritable storing area of a nonvolatile memory connected to a game machine, and which comprises steps of: (a) selecting, as a write-objective backup area a backup area, which stores game data having an older writing time and to which the latest game data can be written; (b) canceling the writing of latest game data, when a writing into the write-objective backup area is not executable and only a backup area that was stored with game data immediately before the latest game data is selectable as a write-objective backup area, so as to leave intact the game data that was written immediately before the latest game data.

In the presently disclosed non-limiting example implementations of both the game data backup control apparatus and the backup control method, it becomes possible to securely leave game data from a previous generation of game play in memory, as is similarly the case for the above-described example game machine implementation.

The above non-limiting features, aspects and advantages of the example implementations described herein will become more apparent from the following detailed description when taken in conjunction with the accompanying drawings.

BRIEF DESCRIPTION OF THE DRAWINGS

FIG. 4 is an illustrative view showing a selection of game data backup areas in an example implementation wherein a flash memory as shown in FIG. 2 is provided with two backup areas;

FIG. 5 is an illustrative view showing a selection of backup areas for an example wherein a flash memory as shown in FIG. 2 is provided with two backup areas;

FIG. 7 is an illustrative view showing one example of a save screen, a save end screen and an error screen as displayed on an LCD display device as shown in FIG. 1 and FIG. 2;

DETAILED DESCRIPTION OF THE PREFERRED EMBODIMENTS

Figure 1:
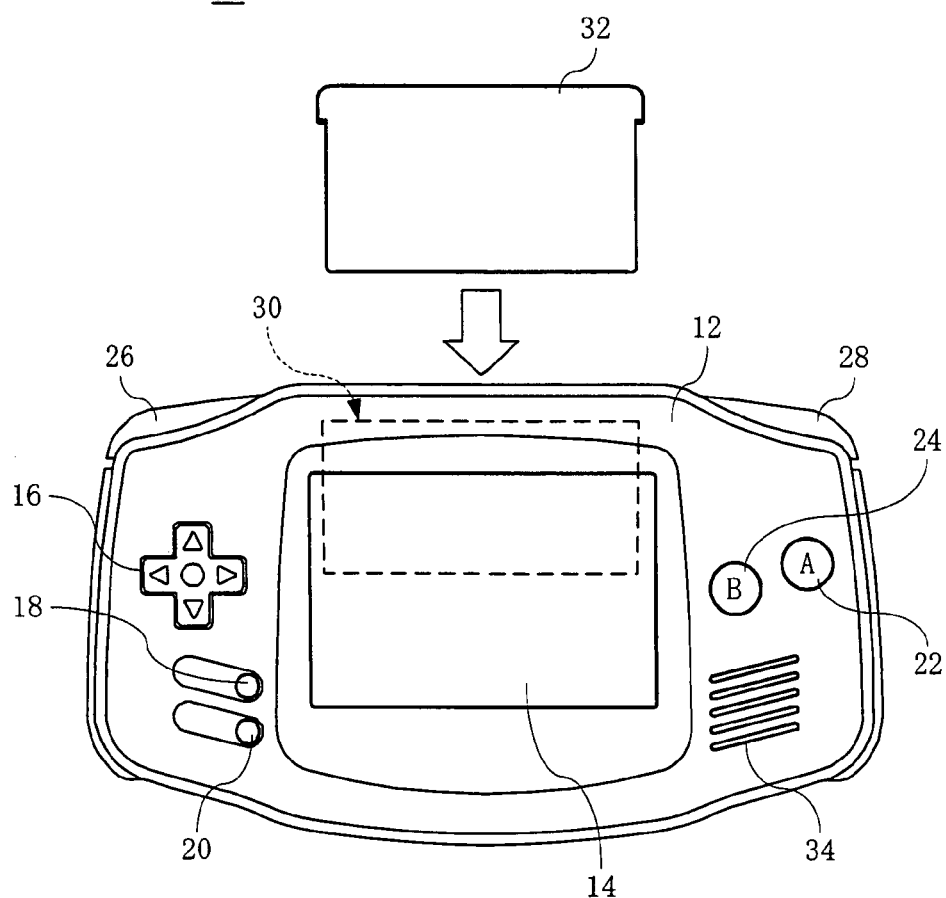
FIG. 1 is an illustrative view showing one example implementation of an appearance of a game machine.

Referring to FIG. 1, a game machine 10 of one example implementation includes a case 12. The case 12 is, on the surface thereof, provided with a color liquid crystal display 14 (hereinafter, referred to as "LCD") at an approximately center. The LCD 14 is displayed with a game space and game characters appearing in the game space, and messages as necessary. The case 12 is on its surface provided with operating buttons 16, 18, 20, 22, 24, 26 and 28. The operating buttons 16, 18 and 20 are placed at a left of the LCD 14, and the operating buttons 22 and 24 are placed at a right of the LCD 14. Furthermore, the operating buttons 26 and 28 are placed at an upper end surface (above the LCD) of the case 12.

The operating button 16 is a cross key which functions as a digital joystick and instructs a moving direction of a game character displayed on the LCD 14 and moves a cursor by operating any one of four depression portions. The operating button 18 is a start button formed by a push button and utilized for instructing a start of the game and etc. The operating button 20 is a select button formed by the push button and utilized for selecting a game mode and etc.

The operating button 22 is an A button formed by the push button and allows the game character displayed on the LCD 14 to perform an arbitrary action such as hitting, throwing, catching, riding, jumping and etc. The operating button 24 is a B button formed by the push button, and utilized for changing to a game mode selected by the select button 20, canceling the action determined by the A button 22, and etc. The operating button 26 is a left depression button (L button) formed by the push button, and the operating button 28 is a right depression button (R button) formed by the push button. The operating buttons 26 and 28 can perform the same operation as the A button 22 and the B button 24 and also function as a subsidiary of the A button 22 and the B button 24.

The case 12 is, at an upper end of its rear surface, formed with a loading slot 30 into which a game cartridge 32 is loaded. Although not illustrated, connectors are respectively provided at a depth portion of the loading slot 30 and at an end portion of the game cartridge 32 in the loading direction, and when the game cartridge 32 is loaded in the loading slot 30, the two connectors are connected with each other. Therefore, the game cartridge 32 is allowed to be accessed by a CPU 40 of the game machine 10 (see FIG. 2).

Furthermore, the case 12 is below the A button 22 and the B button 24 on its surface provided with a speaker 34 for outputting a BGM, voices or onomatopoeic sound of the character and so on during the game.

It is noted that although not illustrated, the case 12 is provided with an external expansion connector on its upper surface, a battery accommodating box on its rear surface and a power switch, a sound level volume, an earphone jack and etc. on its bottom surface.

Figure 2:
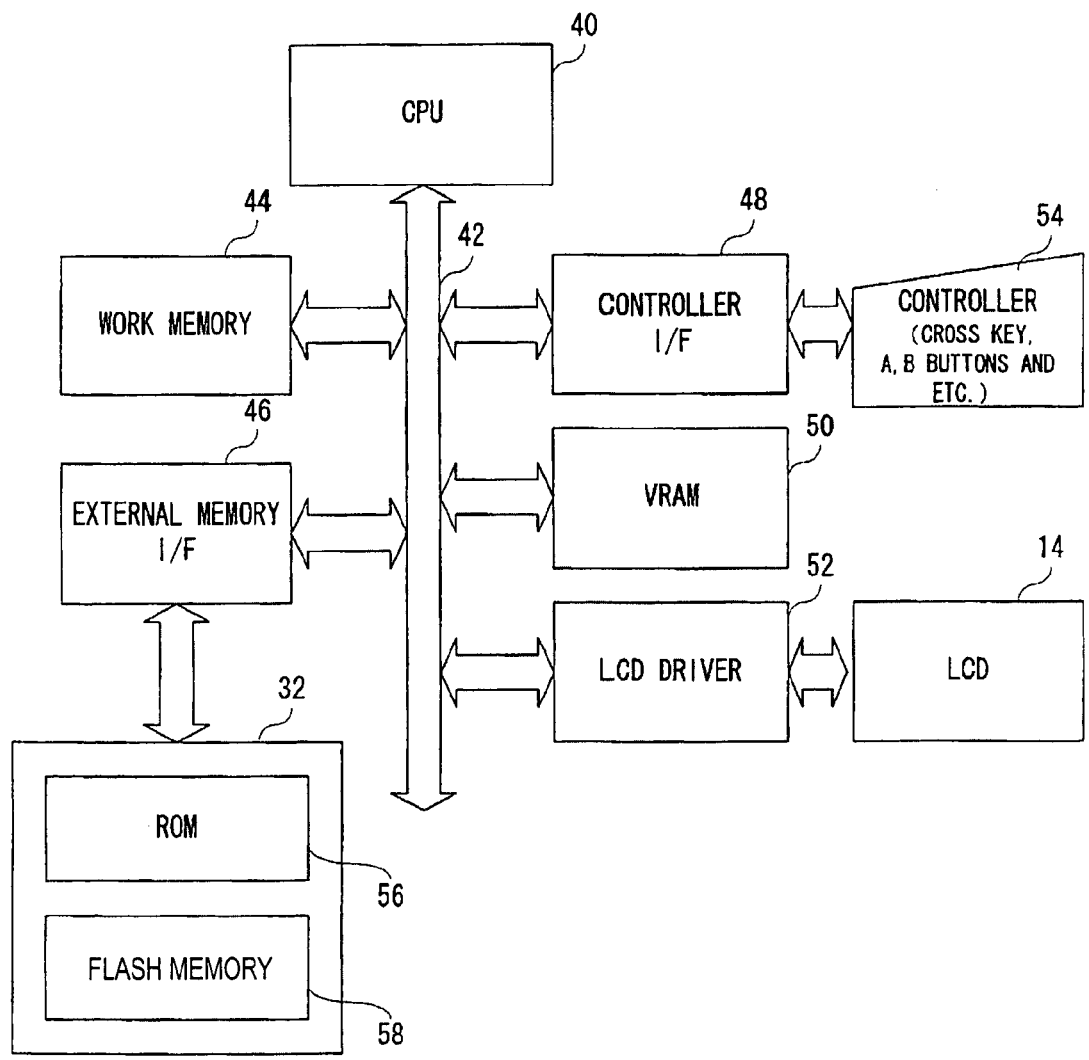
FIG. 2 is a block view showing an electrical configuration of the game machine shown in FIG. 1.

An electrical configuration of the game machine 10 is shown in FIG. 2. Referring to FIG. 2, the game machine 10 is provided with the CPU 40 as described above. The CPU 40 is called as a computer, a processor or the like and performs an overall control of the game machine 10. The CPU or computer 40 is connected to a work memory 44, an external memory interface (I/F) 46, a controller I/F 48, a VRAM 50 and an LCD driver 52 via an internal bus (hereinafter, simply referred to as "bus").

The work memory 44 is utilized as a work area or a buffer area of the CPU 40. The external memory I/F 46 is connected with the game cartridge 32 loaded in the loading slot 30 via the connector (not shown) as described above.

The controller I/F 48 is connected with a controller 54 including the cross key 16, the start button 18, the select button 20, the A button 24, the B button 26, the L button 30 and the R button 32, and therefore, an operation signal in response to an operation of these buttons is input to the CPU 40 via the controller I/F 48.

The VRAM 50 is rendered with game image data and character image data in accordance with instructions of the CPU 40. Furthermore, the LCD driver 52 reads the game image data and the character image data rendered on the VRAM 50 in accordance with instructions of the CPU 40 and displays a game screen and characters on the LCD 14.

Furthermore, the game cartridge 32 is provided with a ROM 56 and a flash memory 58 of one example of a nonvolatile memory, and although not illustrated, the ROM 56 and the flash memory 58 are connected with each other via a bus and connected to connectors. Accordingly, as described above, when the game cartridge 32 is loaded into the game machine 10, the CPU 40 is electrically connected to the ROM 56 and the flash memory 58.

It is noted that although the flash memory 58 is utilized in this embodiment, as another nonvolatile memory, a ferroelectric memory (FeRAM), EEPROM and etc. can also be utilized.

Figure 3:
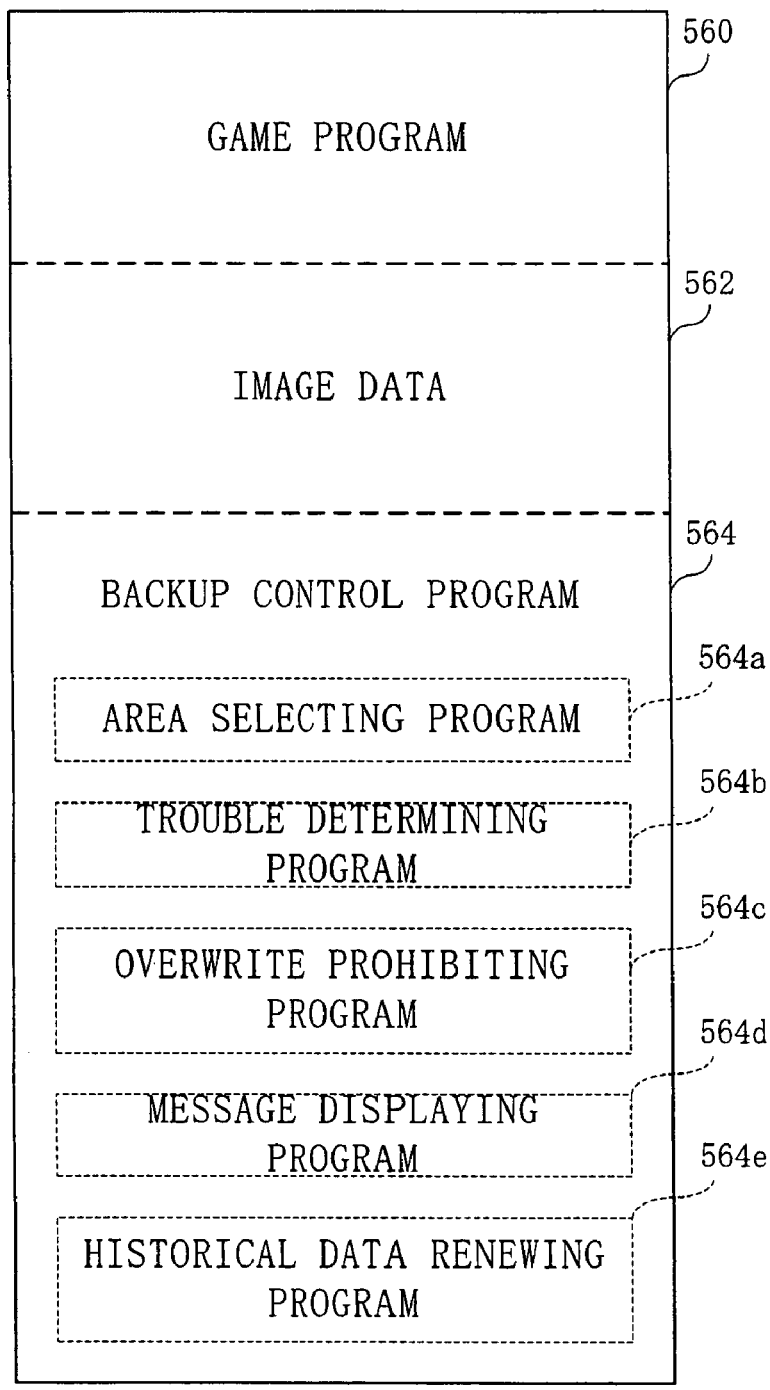
FIG. 3 is an illustrative view showing a memory map of a ROM provided in a game cartridge shown in FIG. 2.

The ROM 56 is previously retained (stored) with a game program 560, image data (game image data, character image data, message display image data and etc.) 562, a backup control program 564 as shown in FIG. 3. The backup control program 564 comprises an area selecting program 564a, a trouble determining program 564b, a overwrite prohibiting program 564c, a message displaying program 564d and a historical data renewing program 564e. It is noted that these programs 564a to 564e are not executed independently but executed as a series of processes (see FIG. 10).

It is noted that although not illustrated, the ROM 56 is stored with various data such as sound data and etc. required for the game and programs required therefore.

In addition, the flash memory 58 is stored with game data (backup data). For example, when a user plays the game by utilizing the game machine 10, game data is stored (renewed) in the work memory 44 of the game machine 10 in accordance with the progress of the game. Then, the game data is written (saved) into the flash memory 58 of the game cartridge 32 in response to an instruction of the user or at a predetermined timing (event). Thereafter, in a case the game is to be continued, the game is advanced as it is, and then, storing and backup of the game data described above are executed. Furthermore, in a case of ending the game once, the user reads the game data backed-up the last time (i.e., the last play session) and starts or resumes next time where the user left off.

The flash memory 58, as compared with a memory such as SRAM, has an advantage of requiring no backup power source but has disadvantage of being short in rewritable life and in rewriting speed. Especially, at a time of writing data, when unwritable problems such as physical breakdown, electrical breakdown and etc. occur, a part of the game data cannot be written and hence, loss of the game data occurs. In particular, since game data is frequently rewritten as a game progresses as described above, without taking preventive measures, the chance for loss of the game data clearly exists.

It is noted that the physical breakdown includes a memory cell (storage element) breakdown, a soldering defect, a wiring defect and etc. The electrical breakdown includes a shutdown due to carelessness, an instant power failure and etc. In a case of the instant power failure, a problem of not returning to a restoring process and etc. occurs.

In one example implementation, the flash memory 58 is provided with two backup areas in which the game data is sequentially stored. Thus, even if one backup area is broken down, the other backup area may be used to retain the game data, and whereby, it is possible to prevent all the data from being completely lost. Furthermore, when the only operation which may be done is to perform an overwrite to game data (old game data) written immediately before, overwriting on the old data written immediately before is prevented (prohibited). Thus, a loss of the game data due to a problem occurring during a writing of the latest game data over the old game data can be prevented.

It is noted that the flash memory 58 generally needs to be rewritten with data sector (block) by sector (block), but some products are rewritable address by address, and in this embodiment, the backup area includes one or two more sectors. That is, the number of the sectors included in the backup area is determined depending upon a volume of the game data.

The flash memory 58 has a first backup area 58a and a second backup area 58b as shown in FIG. 4(A). Furthermore, as described above, the game data includes (is added with) historical data so as to sequentially write the game data to the first backup area 58a and the second backup area 58b in this embodiment. That is, FIG. 4(A) shows a state that game data having historical data (1) is written to the first backup area 58a, and game data having historical data (2) is written to the second backup area 58b.

It is noted that it is also possible to determine which is the older game data by storing a pattern of saved game data in the work memory 44 in place of the historical data, for example.

Herein, in a situation where the game data that is stored in the work memory 44 of the game machine 10 is written to the flash memory 58 as "latest game" data, historical data (3) is assigned to this latest game data, and an area to which this latest game data is to be written is selected between the first backup area 58a and the second backup area 58b according to a predetermined rule (condition for area selection).

The historical data is assigned to the game data in the order of 1→2→3→4→1 by the CPU 40 of the game machine 10, and included in the game data. For example, although not illustrated, the historical data is determined by a count value of a 2-bit counter which is incremented at a time of storing the game data. That is, the count value is varied from one another, "00"("1")→"01"("2")→"10"("3")→"11"("4"), and the counter is reset at a time of a maximum value "11"("11"→"00").

It is noted that the maximum value "11"("4") is determined to be multiples of the number of the backup areas. Accordingly, it is appropriate that a counter capable of counting at least the multiples of the number of the backup areas is utilized as the counter.

Furthermore, the condition for area selection is represented by four inequalities of 2>1, 3>2, 4>3, 1>4. These numerals 1 to 4 are numerical values indicated by the historical data and mean that the game data including the historical data of a numeral on the right side is older than the game data including the historical data of a numeral on the left side (written to the flash memory 58 earlier). Such the condition for area selection is determined (defined) by inequalities (conditions) utilized in correspondence to the historical data of the "latest game" (i.e., latest saved) data, and specifically represented by table 1.

TABLE 1

| Historical Data of Last Game Data | Condition for Area Selection |
|---|---|
| 1 | 4 > 3 (3 is older than 4) |
| 2 | 1 > 4 (4 is older than 1) |
| 3 | 2 > 1 (1 is older than 2) |
| 4 | 3 > 2 (2 is older than 3) |

Accordingly, in FIG. 4(A) state, as a write-objective area for saving the latest game data including the historical data (3), the first backup area 58a stored with the game data having an older writing time is selected according to the condition of the area selection (2>1). The same is true for the following examples so as to select the write-objective backup area. Then, when the latest game data is written to the first backup area 58a, a state becomes like FIG. 4(B).

In a FIG. 4(B) state, which shows the next time saving of game data (latest game data) is performed, the historical data (4) is assigned to the latest game data obtained from game data stored in the work memory 44, and as a write-objective area for storing this latest game data, the second backup area 58b is selected according to the condition for area selection (3>2). Once this latest game data including the historical data (4) is written to the second backup area 58b, the state is like that shown in FIG. 5(A).

In a FIG. 5(A) state, which shows the next saving of game data (i.e. the next time the latest game data is saved), the historical data (1) is assigned to the game data from work memory 44, and as a write-objective area for storing this latest game data, the first backup area 58a according to the condition for area selection (4>3) is selected. When the latest game data including the historical data (1) is written to the first backup area 58a, a state becomes like FIG. 5(B).

In FIG. 5(B) state, which shows the next saving of game data, the historical data (2) is assigned to the latest game data from work memory 44, and as a write-objective area for storing this latest game data, the second backup area 58b is selected in accordance with the condition (1>4). Then, this latest game data including the historical data (2) is written to the second backup area 58b.

Thus, although the writing (overwriting) of the game data is executed according to the condition for area selection, in some cases the latest game data cannot be written to the area selected according to the condition for area selection due to the physical breakdown and the electrical breakdown. In this case, although it is probable that overwriting is performed with respect to the game data immediately before (one generation ago), if the physical breakdown or the electrical breakdown occurs during the overwriting, all the game data may be lost and therefore, the overwriting is prohibited. That is, a writing process of the game data is forcedly terminated.

Figure 6:
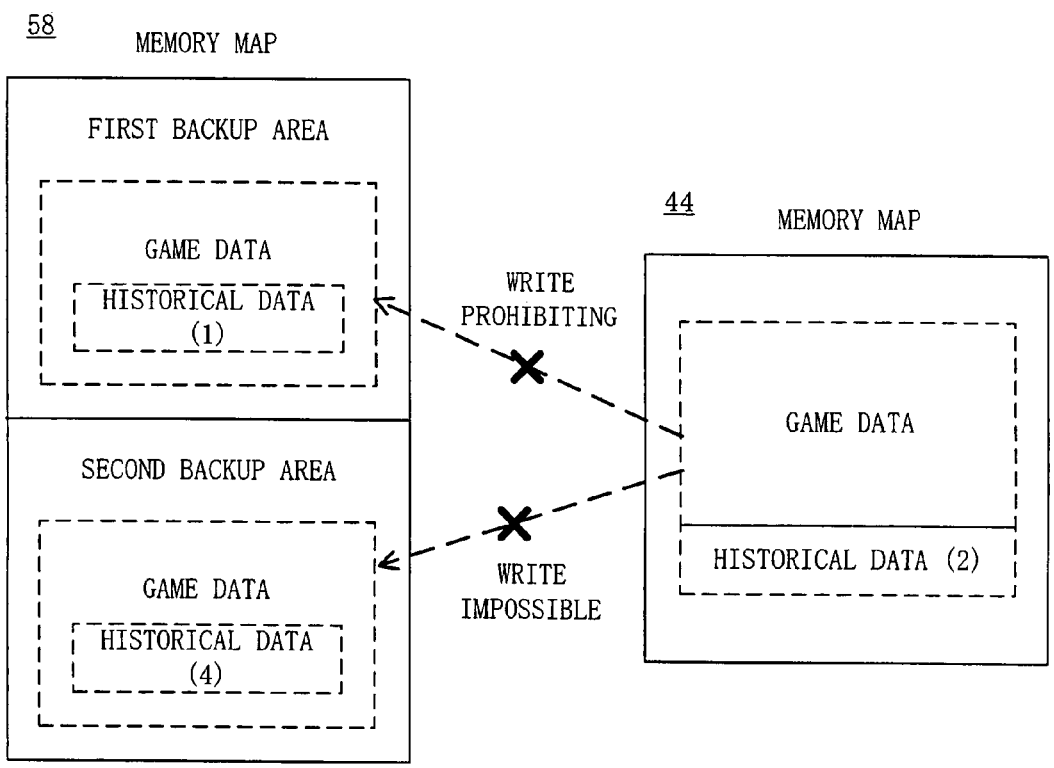
FIG. 6 is an illustrative view showing an example state in which two backup areas of a flash memory as illustrated by FIG. 2 are provided, wherein one backup area is unwritable and the other backup area is prohibited from being written.

Specifically, as shown in FIG. 6, in a case where the game data which includes historical data (1) is written into the first backup area 58a and the game data which includes historical data (4) is written into the second backup area 58b, as the write-objective area for the latest game data (stored in memory 44) which includes historical data (2), the second backup area 58b is selected according to the condition of the area selection (1>4). Then, a writing process for writing this latest game data is executed. In this writing process, it is determined whether or not the game data is written normally by using a checksum, and in the instance that a normal writing is not performed, the writing process is repeated a plural number of times (e.g., three times). As a consequence of repeating the writing process plural times, if a failure of a normal writing of the game data still occurs, then that backup area is designated as unwritable. Then, the writing process of the game data is forcedly terminated so as to prevent the writing of data to the other remaining backup area (first backup area 58a in FIG. 6).

Furthermore, in a case the game data cannot be written to the flash memory 58, an alarm message is displayed on the LCD 14 so as to urge the user to exchange the flash memory 58 (to repair the game cartridge 32). For example, when the user instructs to store the game data (display a save screen), in response thereto a screen for selecting whether or not the saving is to be executed (save screen) is displayed on the LCD 14 as shown in FIG. 7(A). Specifically, the CPU 40 reads image data of the save screen from the image data 562 stored in the ROM 56 of the game cartridge 32 according to an instruction of the user and develops the same on the VRAM 50. Then, the LCD driver 52 reads the image data of the save screen developed on the VRAM 50 according to the instruction of the CPU 40 and outputs the same on the LCD 14.

Every time the screen is displayed, such the process is executed in the following description, and therefore, a detailed description on each occasion will be omitted.

It is noted that the save screen is displayed on a part of the game screen, and strictly speaking, the image data of the save screen is overwritten to a part of the image data of the game screen developed on the VRAM 50. The same is true for a save end screen and an error screen described later.

If "NO" is selected on the save screen, it is returned to the game screen so as to continue the game. On the other hand, if "YES" is selected, a writing process for writing this latest game data is executed. If writing this latest game data is successful, a screen (save end screen) indicative of a message of an end of the save (normal end) such as "SAVING ENDED" is displayed as shown in FIG. 7(B). On the other hand, if writing the latest game data fails and the data is prohibited from being written to the only other remaining backup area, a screen (error screen) indicative of an alarm message such as "BACKUP MEMORY IS BROKEN DOWN. PLEASE REPAIR IT. LAST DATA IS NOT SAVED" is displayed as shown in FIG. 7(C).

As described above, it is possible to securely leave the game data from at least one previous generation stored in the flash memory, and furthermore, when the alarm message is displayed, e.g. (by sending the cartridge for repair to a manufacturer), it is possible to exchange with a new flash memory with the game data one generation ago left. This allows, although the game data is one generation ago, the player to resume where the player left off.

Figure 8:
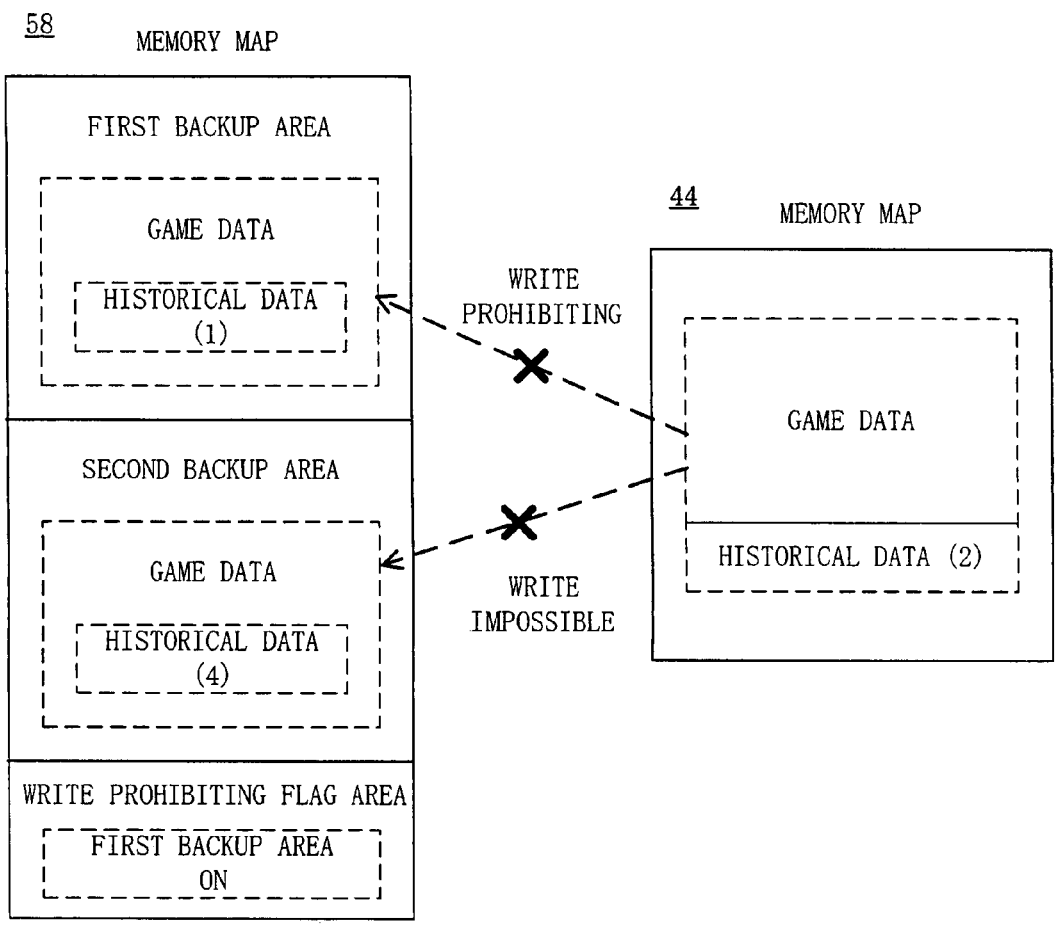
FIG. 8 is an illustrative view showing a state in which two backup areas of a flash memory as illustrated by FIG. 2 are provided and a writing prohibiting flag area is further provided, wherein one backup area is unwritable and the other backup area is prohibited from being written.

It is noted that in a case that after one backup area becomes unwritable and the other backup area is prohibited to be written, the player further advances the game, a message indicative of an unwritable state is displayed at only a time that the latest game data is to be stored, and therefore, there is a fear that a previous effort by the player comes to nothing. Therefore, as shown in FIG. 8, a write prohibiting flag 58c is further provided within the memory 58, and a prohibiting flag of the backup area to which the overwriting is prohibited is set (turned-on), that is, overwriting in the backup area is prohibited, the alarm message can be quickly displayed with reference to the write prohibiting flag 58c at a time of the game start or at a time of being instructed to display the save screen, and therefore, it is possible to eliminate the above-described wasted effort.

Furthermore, it is possible that the physical breakdown or the electrical breakdown occurs in the write prohibiting flag area 58c, and therefore, predetermined data ("FF" in this embodiment) is written to a specific cell (e.g., last cell) of each of the first backup area 58a and the second backup area 58b, and when the writing to the backup area becomes disable, the predetermined data written to the specific cell of the backup area is rewritten by another data (data except for "FF"). This makes it possible to know the backup area which becomes unwritable by searching the data written in the specific cell of each of the backup areas, and in a case one backup area becomes unwritable, it is determined that overwriting on the old game data written to the other backup area is prohibited.

It is noted that the predetermined data ("FF") written to the specific cell is data for prohibiting the game data from being written to the cell on which writing (rewriting) of the data is not generally performed and therefore, the life thereof becomes long.

Figure 9:
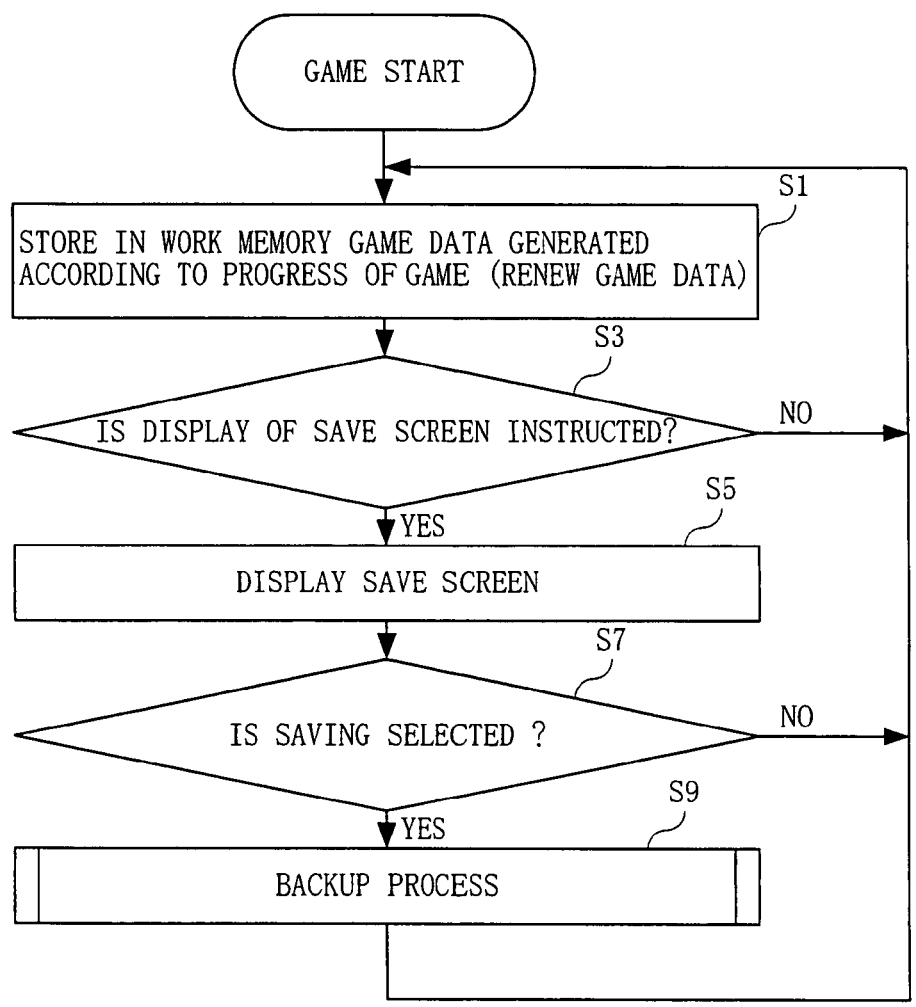
FIG. 9 is a flowchart showing one example implementation of an overall process performed by a CPU shown in FIG. 2.

The above-described operation is processed by the CPU 40 shown in FIG. 2 according to flowcharts shown in FIG. 9 to FIG. 12. As shown in FIG. 9, when the game is started, game data generated according to the progress of the game is stored in the work memory 44 in a step S1. That is, the game data is renewed. In a following step S3, it is determined whether or not save screen display is instructed. If "NO" in the step S3, that is, the save screen display is not instructed, the process directly returns to the step S1.

On the other hand, if "YES" in the step S3, that is, the save screen display is instructed, a save screen shown in FIG. 7(A) is displayed in a step S5.

In a following step S7, it is determined whether or not saving is selected. That is, it is determined whether or not "YES" is selected on the save screen. If "NO" in the step S7, that is, if "NO" is selected, the process directly returns to the step S1. On the other hand, if "YES" in the step S7, that is, if "YES" is selected, a backup process is executed in a step S9, and then, the process returns to the step S1.

It is noted that although a description is only made for the situation where a backup process is executed in response to an instruction by the user to perform a saving of game data as shown in FIG. 9, the backup process may also be automatically executed during the game. For example, a timer for counting a predetermined time is provided, and at a time that the timer counts the predetermined time, the backup process is executed, or in accordance with the progress of the game or in response to a predetermined operation (an operation except for instructing the saving) by the user during the game, the backup process is executed. These are arbitrarily determined (set) by a developer or a programmer of the game.

Figure 10:
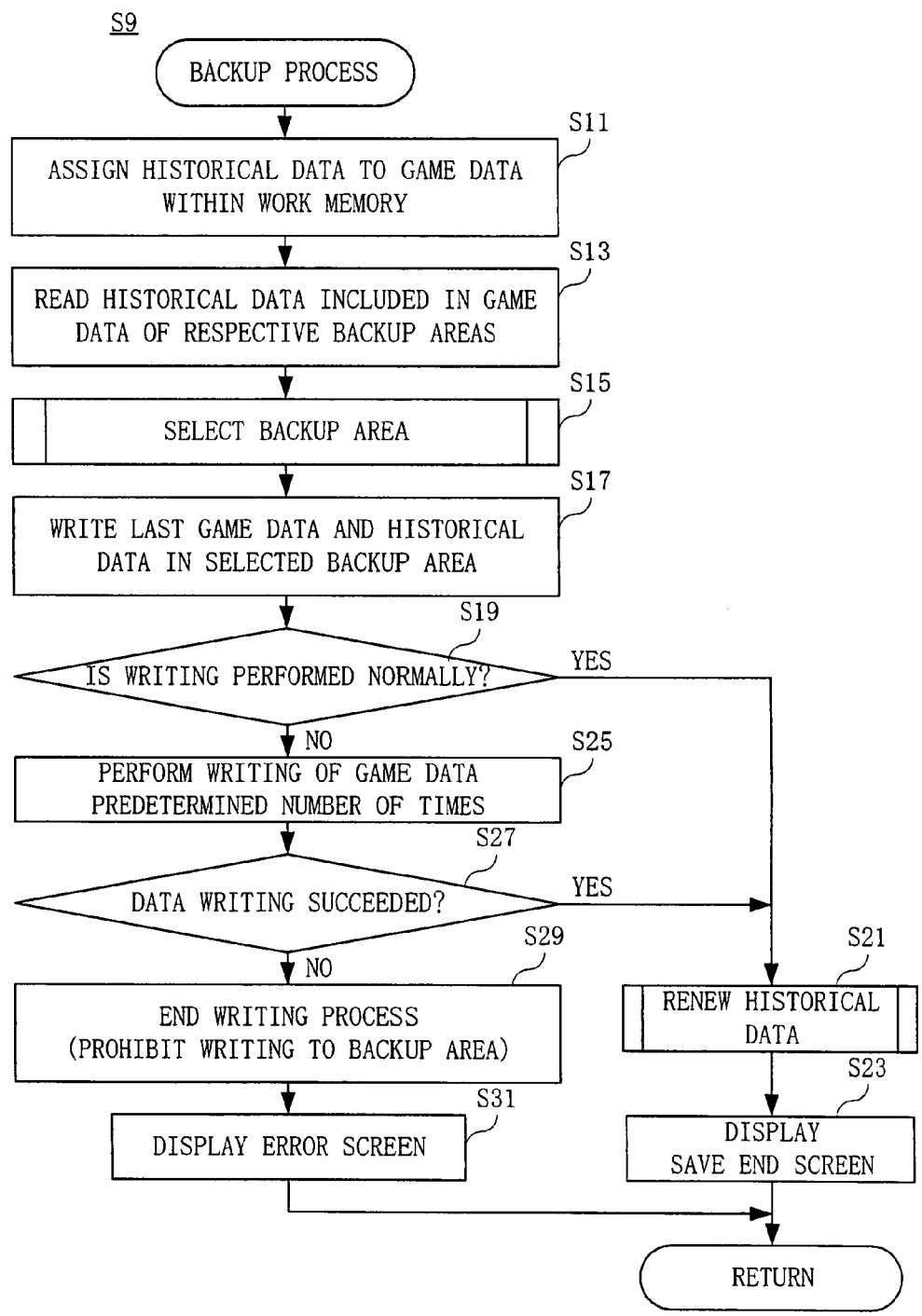
FIG. 10 is a flowchart showing an example backup process performed by the CPU shown in FIG. 2.
Figure 11:
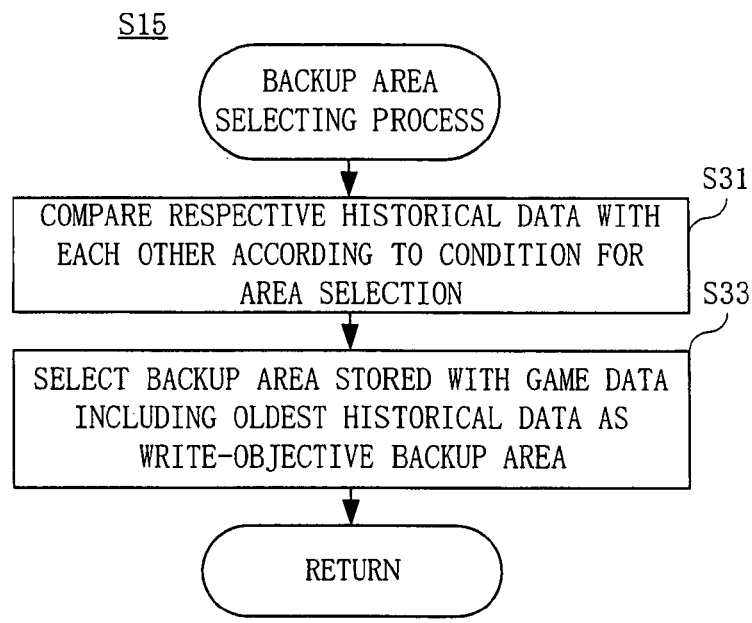
FIG. 11 is a flowchart showing an example backup area selection process of the backup areas of the CPU shown in FIG. 2.

As shown in FIG. 10, when the backup process is started, historical data is assigned to game data stored in the work memory 44 in a step S11. That is, numerical data corresponding to a count value of the counter is assigned (included in) to the latest game data. Next, the historical data included in the game data which is stored in the backup area 58a and the backup area 58b are read in a step S13, and a selecting process of the backup area as the write-objective area is executed in a step S15.

In a following step S17, the latest game data, i.e., latest saved game data, and its associated historical data are written to the selected write-objective backup area. That is, a writing process for saving this latest game data including its historical data is executed. In a step S19, it is determined whether or not a normal writing was performed by use of a checksum. That is, the CPU 40 reads the written game data from the flash memory 58 and compares the game data with the game data stored in the work memory 44 so as to determine if there is a match or coincidence. If there occurs a match, that is, if "YES" in the step S19, it is determined that a normal writing was performed, so a renewal process of the historical data is executed in a step S21, and then, a save end screen shown in FIG. 7(B) is displayed in a step S23 so as to return to the backup process.

On the other hand, in a situation where the compared game data are not coincident to each other, that is, if "NO" occurs in the step S19, it is determined that a normal writing was not performed, so writing of the game data is repeatedly executed a predetermined times (three times, for example) in a step S25. At this time, every time that the writing of the game data is performed, the above-described checksum is performed.

In a following step S27, it is determined whether the writing of the game data succeeded or not. If "YES" in the step S27, that is, if the writing the game data succeeded, the process proceeds to the step S21. On the other hand, if "NO" occurred in the step S27, that is, if a normal writing of the game data failed, even after the writing process is performed a predetermined number of times, the writing process is ended (forcedly terminated) in a step S29 so as to prohibit an overwriting of the game data stored one generation ago. Then, an error screen shown in FIG. 7(C) is displayed in a step S31, and then, the process returns to the backup process. Thus, in the situation where the writing process of the game data (latest game data) is forcedly terminated, the saving of the latest game data is abandoned or canceled.

It is noted that in a case of providing the write prohibiting flag area 58c in the flash memory 58 as shown in FIG. 8, it is appropriate that writing of the write prohibiting flag is executed when the writing of the game data is ended in the step S29, and then, the error screen is displayed in the step S31. This makes it possible to easily know whether or not a writing of the latest game data is going to be prohibited by referring with the write prohibiting flag area at a time of starting the game or at a time that the save screen is instructed to be displayed, and therefore, it is possible to immediately display the error screen.

Furthermore, even if the write prohibiting flag area 58c is not provided, when the writing process of the game data is ended in the step S29, the data of the last cell of the backup area which becomes unwritable may be changed. In this case, it is possible to easily know whether or not a writing of the latest saved game data is going to be prohibited by referring to the data in the last cell of each of backup areas at a time of starting the game or at a time that the save screen is instructed to be displayed.

As shown in FIG. 1, when a selecting process of the backup area is started, each of the read historical data is compared with each other in accordance with the condition for area selection described above in the step S31. The condition for area selection utilized at this time is determined depending upon the historical data assigned to the latest game data as described by utilizing the table 1. The backup area to which the game data including the oldest (order) historical data is to be written is selected as the write-objective backup area and, the then, the selecting process is returned.

It is noted that in a case the game data is not stored in the flash memory 58 in an initial state, it is impossible to refer the historical data. Therefore, priorities are assigned to respective areas, and until the game data is written to all the backup areas, the game data may be written according to the priorities. That is, it is possible to write the game data from the first backup area 58a to the second backup area 58b in this order or in reverse order thereto.

Figure 12:
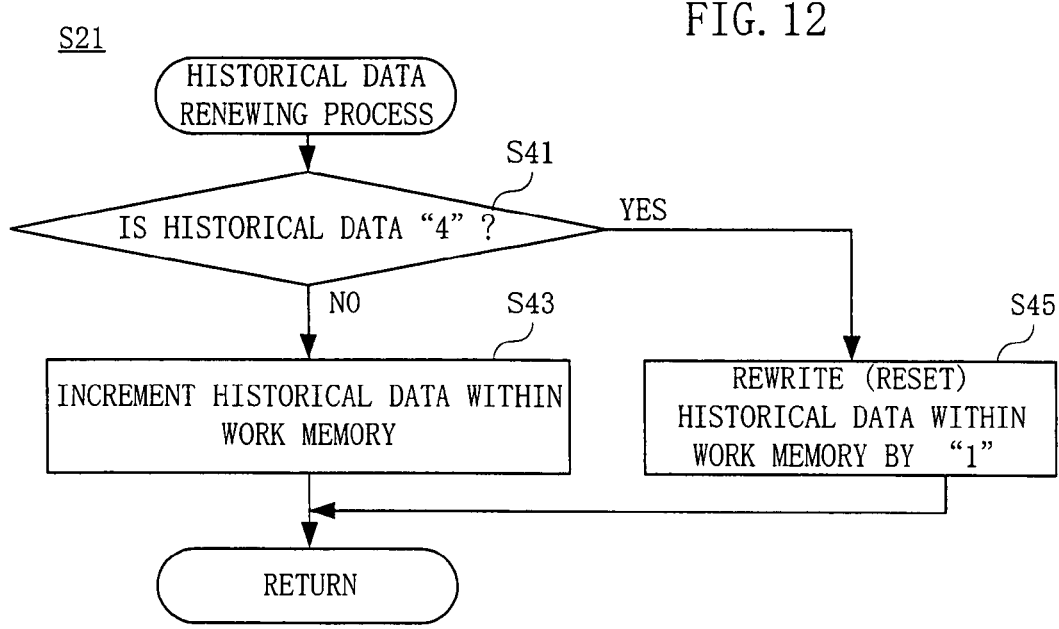
FIG. 12 is a flowchart showing an example historical data renewal process of historical data of the CPU shown in FIG. 2.

Furthermore, as shown in FIG. 12, when a renewal process of the historical data is started, it is determined whether or not the historical data is "4", that is, a count value of the counter is "11" in a step S41. If "NO" in the step S41, that is, if the count value is not "11", the historical data within the work memory 44 is added with 1 in a step S43, that is, the counter is incremented, and then, the renewal process of the historical data is returned.

On the other hand, if "YES" in the step S41, that is, if the count value is "11", the historical data within the work memory 44 is rewritten by "1" in a step S45, that is, the counter is reset and then, the renewal process of the historical data is returned.

In at least one example implementation, when writing of the game data to one backup area becomes disabled, writing of the game data to the other back-up area is prohibited, and therefore, it becomes possible to securely leave game data from one previous generation stored in memory. That is, it is possible to prevent the previously stored game data from being damaged.

In addition, the number of rewriting times of the two backup areas is made even by sequentially writing the game data to the respective backup areas, and therefore, it is possible to maximize the life of the flush memory for rewriting.

The game machine 10 of another example implementation, discussed below, is the same as the above-described implementation except that three or more backup areas are formed in the flash memory 58 provided in the game cartridge 32, and therefore, a duplicated description is omitted.

Figure 13:
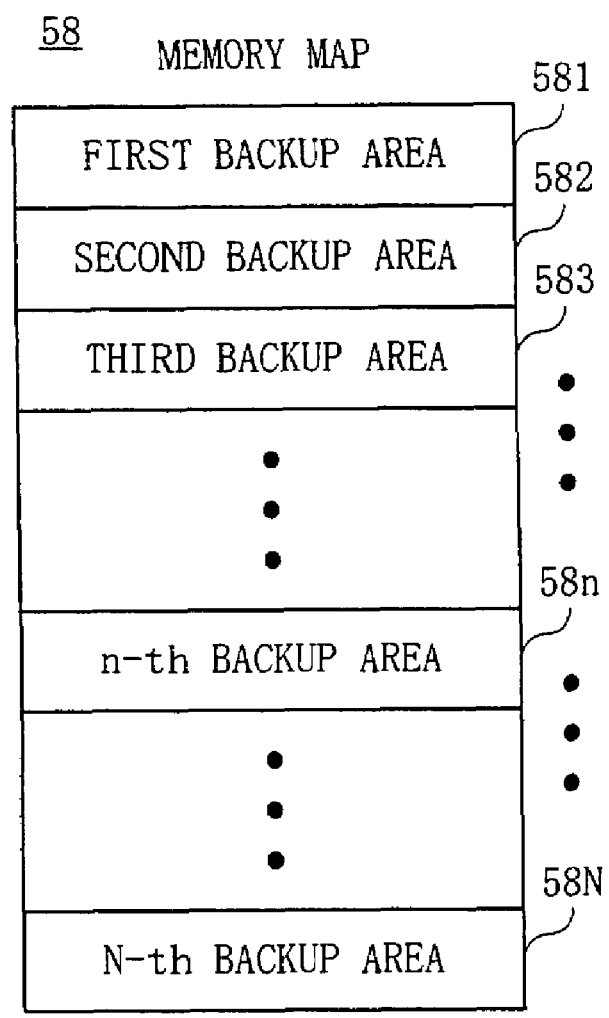
FIG. 13 is an illustrative view showing another non-limiting illustrative example of a memory map of a flash memory provided in a game cartridge.

As shown in FIG. 13, the flash memory 58 is provided with N of the backup areas 58n (1≦n (natural number)≦N). In this example implementation, the game data is sequentially stored in respective one of the backup areas 58n in the same manner as the above-described embodiment. For example, until the game data is stored in all the backup areas 58n, the backup areas are selected from n=1 in order so as to store the game data; however, after the game data is stored in all the backup areas 58n, the game data is overwritten according to a predetermined condition for area selection.

It is noted that the backup area is first selected from n=1 in order until the game data is stored in all the backup areas 58n in this example implementation; however, if only the writing is not performed on the same backup area, the backup area may be selected by an arbitrary method.

The condition for area selection in this implementation is as shown in Table 2 (below), and the condition for area selection to be utilized is, as the above-described implementation, determined in advance in correspondence to the historical data of the latest game data. For example, if the historical data of the latest game data is "1", the condition for area selection utilized is 2N>2N−1> . . . >N+2>N+1.

TABLE 2

| Historical Data of Last Game Data | Condition for Area Selection |
|---|---|
| 1 | 2N > 2N − 1 > ... > N + 2 > N + 1 |
| 2 | 1 > 2N > ... > N + 3 > N + 2 |
| 3 | 2 > 1 > 2N > ... > N + 4 > N + 3 |
| . | . |
| . | . |
| . | . |
| N − 1 | N − 2 > N − 3 > ... > 1 > 2N > 2N − 1 |
| N | N − 1 > N − 2 > ... > 2 > 1 > 2N |
| N + 1 | N > N − 1 > ... > 3 > 2 > 1 |
| . | . |
| . | . |
| . | . |
| 2N − 2 | 2N − 3 > 2N − 4 > ... > N − 1 > N − 2 |
| 2N − 1 | 2N − 2 > 2N − 3 > ... > N > N − 1 |
| 2N | 2N − 1 > 2N − 2 > ... > N + 1 > N |

That is, as the above-described embodiment, a counter capable of counting numbers more than the multiples (2N) of the number of the backup areas (N) is provided, and a numerical value of the historical data is sequentially renewed by incrementing a count value of the counter. Furthermore, when a multiple of the number of the backup areas is counted, the counter is reset and therefore, it is possible to set the condition for area selection by utilizing simple inequalities shown in the table 2.

In addition, similar to the above-described implementation, the game data including the historical data indicated by the numeral on the right side of the inequality sign is older than the game data including the historical data indicated by the numeral on the left side of the inequality sign. Accordingly, in a case of writing the latest game data according to the condition for area selection, the backup area stored with the game data including the historical data of the numeral described at the right end (far-right side) is selected as the write-objective backup area.

It is noted that in a case the backup area which becomes unwritable exists, the historical data of the game data stored in the backup areas except for the backup area which becomes unwritable is acquired, and by applying them to the condition for area selection, the write-objective backup area is selected. Accordingly, in a case the backup area stored with the game data including the historical data having a numeral at the far-right side of the condition for area selection becomes unwritable, the backup area stored with next older game data (game data including the historical data having a numeral at a second position from the right end) is selected as the write-objective area. That is, the read historical data is compared according to the condition for area selection, and consequently, the backup area stored with the game data including the historical data of the numeral at the far-right side is selected as the write-objective backup area. In other words, the backup area stored with the game data having an older time of writing to the flash memory 58 is preferentially selected.

Next, a description is provided of the process implemented by CPU 40; however, since the process is the same as the previously-described implementation except that a part of the backup process is changed, and so therefore, a redundant description of the process is omitted.

Figure 14:
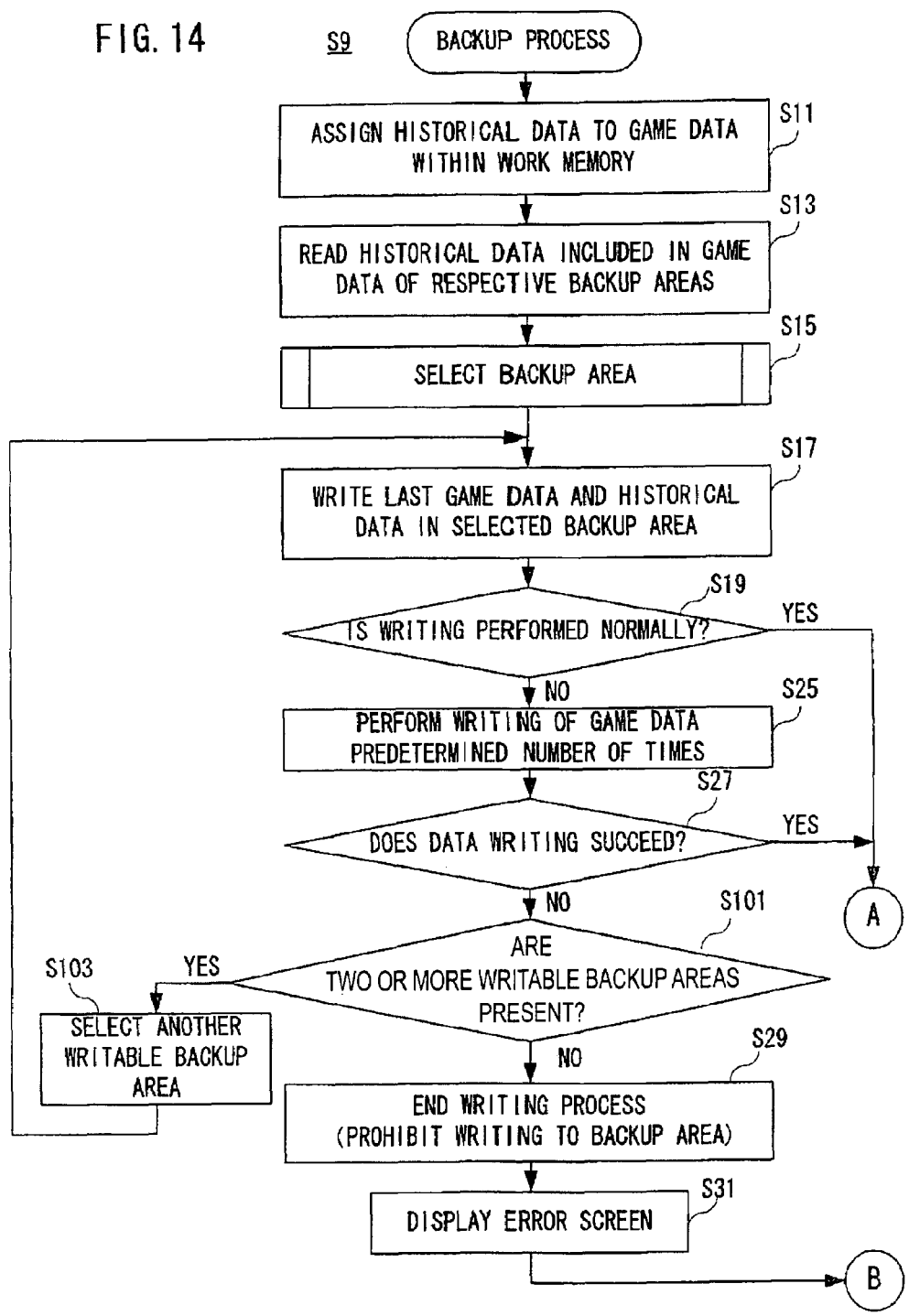
FIG. 14 is a flowchart showing a part of a backup process performed by the CPU for a memory map as shown in FIG. 13.
Figure 15:
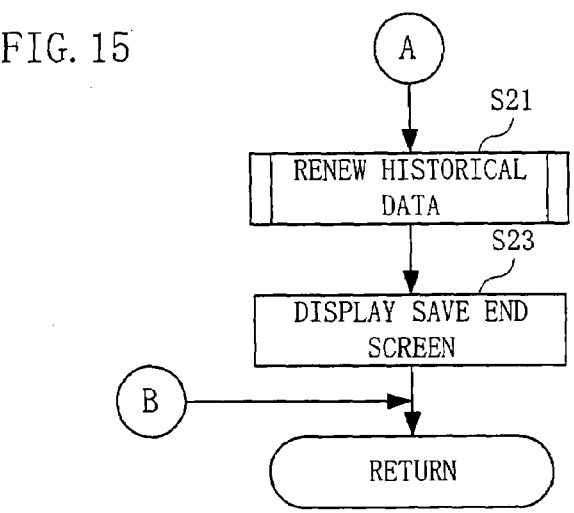
FIG. 15 is a flowchart showing another part of the backup process performed by the CPU for a memory map as shown in FIG. 13.

More specifically, the CPU 40 executes a backup process according to a flowchart shown in FIG. 14 and FIG. 15. It is noted that FIG. 14 and FIG. 15 are applied with the same reference numerals (step numbers) as FIG. 10 with respect to the same or similar process.

As shown in FIG. 14, in the backup process of this embodiment, if "NO" in the step S27, that is, if failing in writing of the game data, it is determined whether or not another writable backup area is present in a step S101. More specifically, it is determined whether or not two or more writable backup area exist. If "NO" in the step S101, that is, if only one writable backup area is present, the writing process of the game data is ended in the step S29 so as to prohibit the writing of the backup area.

On the other hand, if "YES" in the step S101, that is, two or more writable backup area exist, another writable (write-objective) backup area is selected in a step S103, and then, the process returns to the step S17. That is, in the step S103, a backup area stored with next older game data to the game data recorded in the backup area selected by the selecting process of the backup area in the step S15 is selected. Thus, the selecting process of the write-objective backup area is repeatedly executed until the overwriting is prohibited.

It is noted that although it is determined whether or not another writable backup area exists in the step S101 in this embodiment, the determination may also be simplified by providing the write prohibiting flag described in FIG. 8.

Figure 16:
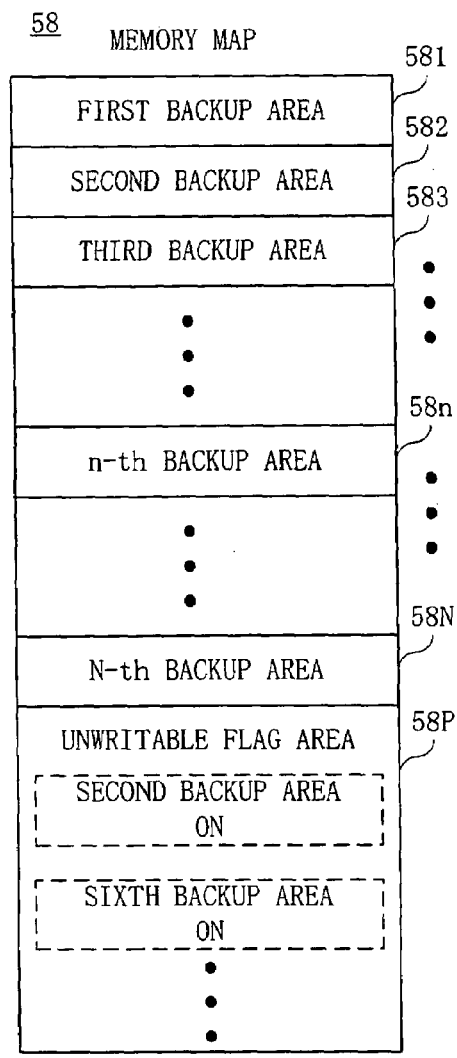
FIG. 16 is an illustrative view showing another example of the memory map of the flash memory provided in the game cartridge loaded into the example game machine illustrated in FIG. 13 embodiment.

It is noted that until the write prohibiting flag is turned-on, that is, a normal backup area becomes one, the writing process of the game data to the backup area which becomes unwritable is executed, and therefore, as shown in FIG. 16, by providing a writing area (unwritable flag area) 58p of the flag (unwritable flag) as to the backup area which becomes unwritable, an unnecessary writing process is avoided, and whereby, it is possible to quickly complete the backup process. In this case, when the unwritable flag area 58p is fixed, in a case a physical breakdown or an electrical breakdown occurs to the area, it becomes impossible to refer to the unwritable area with ease, and therefore, it is necessary for the unwritable flag area 58p to be moved (rewritten) to another backup area 58n in a case rewriting is required in the same manner as the backup area 58n. For example, it is appropriate that the unwritable flag area 58p is rewritten to the backup area recorded with the next older data to the game data recorded in the backup area 58 written with the latest game data. Accordingly, in this case, it is necessary to complete the writing process at a time that two writable backup areas are present.

Furthermore, in a case where the unwritable flag area 58p is not provided, if data indicative of whether writable or unwritable is written to the end cell of each backup area, as in the above described previous example implementation, it is possible to know the unwritable backup area 58n.

According to this example implementation, when writing is performed to the oldest game data and writing of the game data is disabled with respect to all the backup areas but one, writing of the game data to the one backup area is prohibited, and therefore, it is possible to surely leave the game data one generation ago. That is, it is possible to prevent the game data from being damaged.

In addition, by sequentially writing the game data in a plurality of backup areas, the number of the writing times to the respective backup areas can be made even, and therefore, it is possible to maximize a writable life of the flush memory.

It is noted that although a description is made on the game machine of the present invention taking the portable game machine as an example in the embodiments, it is needless to say that the present invention can be applied to any form of electronic device such as personal computer, game machine for home use, arcade game machine, portable information terminal, cellular phone, and etc. if only it functions as a game machine which executes a game program and saves the game data in a nonvolatile memory such as flush memory and etc.

In addition, the ROM and the nonvolatile memory stored with the backup control program need not to be loaded in the game machine in a detachable manner and may be provided within the game machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game machine that is provided with an electrically rewritable nonvolatile memory having two or more game data backup areas, said game machine configured to preserve at least some previously saved game data when performing a game data backup writing process, comprising:

backup memory area selection programmed logic circuitry configured to first select, as a write-objective backup area for storing latest game data, a backup area containing previously stored game data of oldest writing age among said two or more game data backup areas and, if a write attempt to said first selected backup area is unsuccessful after a predetermined number of attempts, to select another write-objective backup area of next oldest writing age among said game data backup areas;

memory controller for writing the latest game data to a backup area selected as a write-objective backup area by said backup memory area selection programmed logic circuitry;

memory write determination programmed logic circuitry configured to determine whether or not a writing of the latest game data to said backup area selected by said backup memory area selection programmed logic circuitry was successful;

memory write attempt repeater programmed logic circuitry configured to repeatedly attempt writing to the write-objective backup area for a predetermined number of attempts if it is determined by said memory write determination programmed logic circuitry that a writing of the latest game data was not successfully performed; and writing prohibitor programmed logic circuitry configured to preclude writing the latest game data to said another write-objective backup area and terminate a game data backup writing process without storing the latest game data if an attempt to write the latest game data to a first selected write-objective backup area is unsuccessful after said predetermined number of attempts and said another write-objective backup area contains the only remaining instance of saved older game data, wherein a failure of a selected write-objective backup area memory element occurring in said electrically rewritable non-volatile memory does not result in an attempt to store game data in a last remaining backup area containing older game data.

2. A game machine according to claim 1, wherein said memory write determination programmed logic circuitry includes a historical information storage programmed logic circuitry for recording historical information including information relating to a write age of generated game data, said historical information being included as part of said latest game data, and for determining an age of said generated game data relative to a write age of other stored game data based on said historical data; and said backup memory area selection programmed logic circuitry includes an earliest write age selector which, before writing the latest game data, selects as the write-objective backup area a backup area stored with game data that was written earlier than an age of the latest game data based on said write age information.

3. A game machine according to claim 1, further comprising message displaying programmed logic circuitry configured to display a predetermined alarm message when a game data backup writing process is terminated without storing the latest game data.

4. A game data backup control method for preserving previously saved older game data when attempting to perform a game data backup writing process to a storage area in an electrically rewritable nonvolatile memory device of a game machine, comprising steps of:

selecting, when a latest game data is to be stored, a backup area stored with game data having an oldest write age among two or more backup areas of said memory device as a write-objective backup area for said latest game data;

attempting a writing of said latest game data to said write-objective backup area selected in said selecting step;

determining whether writing of the latest game data to said backup area selected in said selecting step was successfully performed and, when it is determined that a writing of the latest game data was not successfully performed, repeatedly attempting a writing of said last game data to said selected write-objective backup area for a predetermined number of attempts and, when said predetermined number of attempts to write said latest game data to said selected write-objective backup area are unsuccessful, selecting another write-objective backup area of next oldest writing age among other remaining backup areas of said memory device; and precluding a writing of said latest game data to said another write-objective backup area of next oldest writing age and terminating a game data backup writing process without storing said latest game data when said predetermined number of attempts to write said latest game data to said selected write-objective backup area are unsuccessful and said another write-objective backup area contains the only remaining instance of saved older game data, wherein a failure of a selected write-objective backup area in said electrically rewritable non-volatile memory does not result in an attempt to store game data in a last remaining backup area containing older game data.

5. A game data backup control method according to claim 4, wherein said attempting a writing of said latest game data includes attempting a writing of historical data used for discriminating between relative write ages of previously stored game data, said historical data being included as part of said latest game data.

6. A game data backup control method according to claim 5, wherein said selecting a backup area as a write-objective backup area includes, before writing said latest game data, selecting a backup area stored with game data written earlier than an age of said latest game data based on the historical data.

7. A game data backup control method according to claim 4, further comprising:

displaying a predetermined alarm message when a game data backup writing process is terminated without storing the latest game data.

8. A game data backup control method for controlling whether or not latest game data is written into designated data storage backup areas in an electrically rewritable nonvolatile memory of a game machine, comprising:

selecting, as a write-objective, a backup area in said nonvolatile memory that contains an oldest written game data and which is available for storing said latest game data and, when a write attempt to a selected backup area is unsuccessful after a predetermined number of attempts, selecting another write-objective backup area of next oldest written data; and precluding a writing of said latest game data into said another write-objective backup area and terminating a game data backup writing process without storing the latest game data when an attempt to write the latest game data into a first selected write-objective backup area is not successfully executable after a predetermined number of repeated attempts and said another write-objective backup area contains the only remaining instance of saved older game data, wherein a failure of a write-objective backup area memory element occurring within the electrically rewritable non-volatile memory device does not result in an attempt to store game data in a last remaining backup area containing older game data.

9. In a game machine having a nonvolatile memory, said memory including a plurality of electrically rewritable game data backup storage areas, a method of backing up game data, comprising:

generating latest game data corresponding to latest conditions in a game being played;

designating one of said game data backup storage areas that contains an oldest written game data relative to game data written in other backup storage areas as a write-objective target for storing said latest game data and, when a write attempt to a first write-objective target is unsuccessful after a predetermined number of attempts, designating another write-objective target of next oldest written data; and precluding a writing of said latest game data into said another write-objective target and prohibiting further attempts to write to said backup storage areas when an attempt in writing to said first write-objective target backup storage area is unsuccessful after a predetermined number of repeated unsuccessful attempts and said another write-objective target contains the only remaining instance of saved older game data; and causing said game machine to display an error message indicative of an unsuccessful saving of said latest game data and/or a broken backup storage memory condition, wherein a failure of a memory element in said electrically rewritable non-volatile memory does not result in an attempt to store game data in a last remaining backup area containing older game data.

* * * * *